United States Patent
Inomata

(10) Patent No.: US 9,948,795 B2
(45) Date of Patent: Apr. 17, 2018

(54) IMAGE PROCESSING APPARATUS RECOGNIZING A PARTIAL IMAGE RECORDED IN A SPECIFIED REGION, AND CORRESPONDING IMAGE PROCESSING METHOD, AND NON-TRANSITORY COMPUTER READABLE MEDIUM

(71) Applicant: FUJI XEROX CO., LTD., Tokyo (JP)

(72) Inventor: Kohshiro Inomata, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/085,558

(22) Filed: Mar. 30, 2016

(65) Prior Publication Data
US 2017/0180571 A1    Jun. 22, 2017

(30) Foreign Application Priority Data

Dec. 21, 2015  (JP) .................................. 2015-248169

(51) Int. Cl.
| | |
|---|---|
| G06F 3/12 | (2006.01) |
| H04N 1/00 | (2006.01) |
| G06K 9/00 | (2006.01) |
| H04B 1/3827 | (2015.01) |
| G06K 9/20 | (2006.01) |

(52) U.S. Cl.
CPC ..... *H04N 1/00204* (2013.01); *G06K 9/00449* (2013.01); *G06K 9/2081* (2013.01); *H04B 1/3827* (2013.01); *H04N 1/0083* (2013.01); *G06K 2209/01* (2013.01); *H04N 2201/0081* (2013.01)

(58) Field of Classification Search
None
See application file for complete search history.

(56) References Cited

U.S. PATENT DOCUMENTS

| | | | | |
|---|---|---|---|---|
| 2006/0081696 A1* | 4/2006 | Sakurai | .................. | G06Q 10/08 235/375 |
| 2006/0290999 A1* | 12/2006 | Ebitani | .................... | G09B 7/02 358/426.06 |
| 2007/0146791 A1* | 6/2007 | Murase | .................. | H04N 1/387 358/1.16 |
| 2007/0285722 A1* | 12/2007 | Koyama | ............ | G06K 9/00456 358/1.18 |
| 2011/0157658 A1* | 6/2011 | Yokomizo | .......... | H04N 1/00795 358/474 |

(Continued)

FOREIGN PATENT DOCUMENTS

| | | |
|---|---|---|
| JP | 2011-243053 A | 12/2011 |
| JP | 2013-045309 A | 3/2013 |

*Primary Examiner* — Miya J Williams
(74) *Attorney, Agent, or Firm* — Oliff PLC

(57) ABSTRACT

An image processing apparatus includes an image acquisition unit, a region specifying unit, and a partial-image recognition unit. The image acquisition unit acquires first image data representing a first image and second image data representing a second image that is an image acquired by performing additional recording on the first image. The region specifying unit specifies a region, where additional recording is performed with respect to the first image, of the second image in accordance with the first image data and the second image data acquired by the image acquisition unit. The partial-image recognition unit recognizes a partial image recorded in the region specified by the region specifying unit.

15 Claims, 5 Drawing Sheets

(56) References Cited

U.S. PATENT DOCUMENTS

| | | | |
|---|---|---|---|
| 2012/0236368 A1* | 9/2012 | Uchida | G06K 9/00442 358/3.28 |
| 2014/0140571 A1* | 5/2014 | Elmenhurst | G06K 9/3216 382/101 |
| 2015/0281515 A1* | 10/2015 | Honda | H04N 1/393 358/1.2 |
| 2017/0155778 A1* | 6/2017 | Nakane | H04N 1/00331 |

* cited by examiner

IMAGE PROCESSING APPARATUS RECOGNIZING A PARTIAL IMAGE RECORDED IN A SPECIFIED REGION, AND CORRESPONDING IMAGE PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-248169 filed Dec. 21, 2015.

BACKGROUND (i) Technical Field

The present invention relates to an image processing apparatus, an image processing method, and a non-transitory computer readable medium.

(ii) Related Art

There are many cases where people fill in and submit printed paper sheets (business forms, questionnaires, and the like) by hand. For example, people fill in documents or various questionnaires to be submitted to government and municipal offices and the like. There is a demand that people on the collection side of filled-in paper sheets want handwritten characters, and characters and numbers selected using marks such as a circle in these paper sheets to be automatically read and collected.

SUMMARY

According to an aspect of the invention, there is provided an image processing apparatus including an image acquisition unit, a region specifying unit, and a partial-image recognition unit. The image acquisition unit acquires first image data representing a first image and second image data representing a second image that is an image acquired by performing additional recording on the first image. The region specifying unit specifies a region, where additional recording is performed with respect to the first image, of the second image in accordance with the first image data and the second image data acquired by the image acquisition unit. The partial-image recognition unit recognizes a partial image recorded in the region specified by the region specifying unit.

BRIEF DESCRIPTION OF THE DRAWINGS

An exemplary embodiment of the present invention will be described in detail based on the following figures, wherein.

DETAILED DESCRIPTION

In the following, an exemplary embodiment of the present invention will be described.

Figure 1:
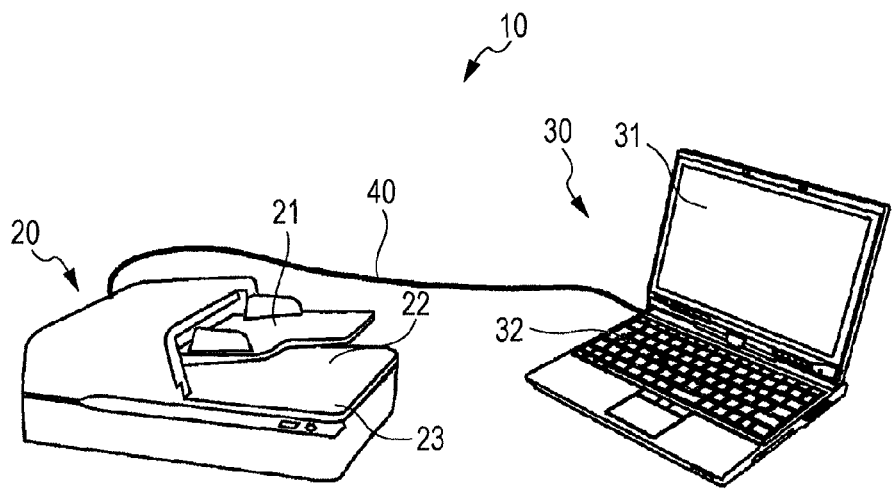
FIG. 1 is an external view of an image processing apparatus as an exemplary embodiment of the present invention.

FIG. 1 is an external view of an image processing apparatus as an exemplary embodiment of the present invention.

An image processing apparatus 10 illustrated here includes a scanner 20 and a notebook personal computer (hereinafter referred to as a "notebook PC") 30. The scanner 20 and the notebook PC 30 are connected via a communication cable 40.

The scanner 20 is an apparatus that reads an image recorded on a document and generates image data. In the case where a document is placed on a document tray 21 of the scanner 20, when a start button (not illustrated) is pressed or a certain command is issued from the notebook PC 30, the document, which is a one-paper-sheet document, is fed into the scanner 20. The scanner 20 is provided with a sensor (not illustrated) that is in the scanner 20 and that photoelectrically reads an image on a document. The image recorded on the document which has been fed into the scanner 20 is photoelectrically read, and image data is generated. The document whose recorded image has been read is output onto a paper output tray 22. In the document tray 21, multiple documents may be stacked and placed. The scanner 20 sequentially feeds thereinto the multiple documents on the document tray 21 on a paper-sheet-by-paper-sheet basis, reads images on the documents fed thereinto, and outputs the documents onto the paper output tray 22.

In addition, an upper cover 23 of the scanner 20 may be raised around a hinge arranged on a rear surface side and extending horizontally as the center of rotation. A document, which is a one-paper-sheet document, may also be read in the case where the upper cover 23 is raised, the document is placed under the upper cover 23, and the upper cover 23 is closed.

Image data acquired through reading performed by the scanner 20 is input to the notebook PC 30 via the communication cable 40.

The notebook PC 30 is provided with a display screen 31 and a keyboard 32, and includes therein devices such as a central processing unit (CPU) and a memory for program execution. In the notebook PC 30, programs are executed, and processes are performed in accordance with the executed programs. The notebook PC 30 according to the present exemplary embodiment executes an image processing program to be described below.

Figure 2:
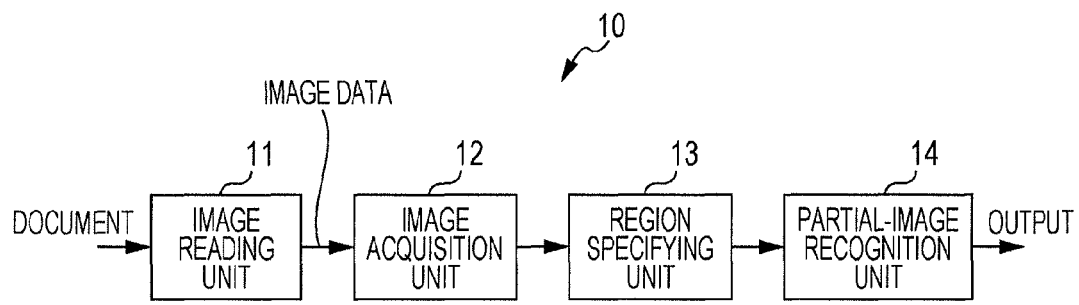
FIG. 2 is a functional block diagram of the image processing apparatus, whose appearance is illustrated in FIG. 1.

FIG. 2 is a functional block diagram of the image processing apparatus 10, whose appearance is illustrated in FIG. 1.

The image processing apparatus 10 according to the present exemplary embodiment functionally includes an image reading unit 11, an image acquisition unit 12, a region specifying unit 13, and a partial-image recognition unit 14.

The scanner 20 illustrated in FIG. 1 plays the role of the image reading unit 11. That is, the image reading unit 11 photoelectrically reads an image on a document and generates image data. As described above, this generated image data is input to the notebook PC 30 via the communication cable 40 illustrated in FIG. 1.

The image acquisition unit 12, the region specifying unit 13, and the partial-image recognition unit 14 are functions realized by execution of the image processing program in the notebook PC 30. Among these, the image acquisition unit 12 acquires image data, which has been generated by the image reading unit 11 and transmitted via the communication cable 40, by receiving the image data. Here, this image data includes first image data representing a first image and second image data representing a second image that is an image acquired by performing additional recording on the first image. The image acquisition unit 12 distinguishes the first image data from the second image data in accordance with the order in which pieces of image data supplied from the image reading unit 11 are acquired. Specifically, in the present exemplary embodiment, the image data transmitted first and representing an image of the first document is recognized as the first image data, and pieces of image data transmitted second and subsequently and representing images of the second and subsequent documents are recognized as pieces of the second image data.

The region specifying unit 13 specifies regions, where additional recording is performed with respect to the first image, of the second image in accordance with the first image data and the second image data acquired by the image acquisition unit 12.

Furthermore, the partial-image recognition unit 14 recognizes partial images recorded in regions specified by the region specifying unit 13. Specifically, in the present exemplary embodiment, the partial-image recognition unit 14 recognizes characters represented by partial images recorded in the regions specified by the region specifying unit 13. The partial-image recognition unit 14 treats, as a recognition target, a partial image located on the first image and corresponding to a certain region specified by the region specifying unit 13. Alternatively, the partial-image recognition unit 14 treats, as a recognition target, a partial image located on the second image and corresponding to the certain region specified by the region specifying unit 13, or a partial image located on the difference image between the first image and the second image and corresponding to the certain region specified by the region specifying unit 13. Regarding the point as to whether the first image is to be a recognition target or the second image or the difference image is to be a recognition target, in the present exemplary embodiment, a partial image located on the second image or on the difference image between the first image and the second image and corresponding to the certain region is treated as a recognition target in the case where the certain region specified by the region specifying unit 13 is a blank region on the first image. In the case where the certain region is not a blank region on the first image, a partial image located on the first image and corresponding to the certain region is treated as a recognition target.

Figure 3:
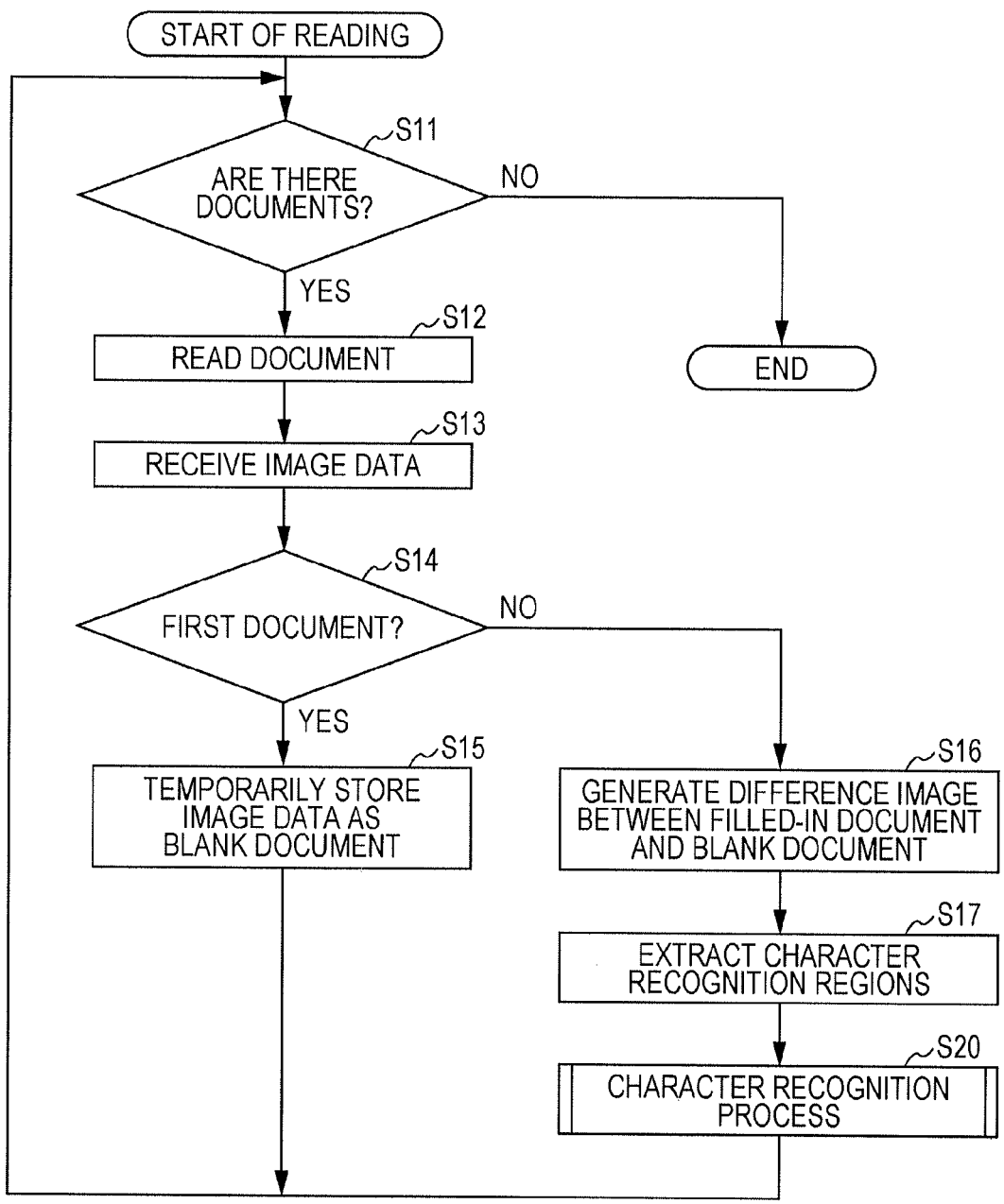
FIG. 3 is a diagram illustrating a flowchart showing a process performed by the image processing apparatus illustrated in FIGS. 1 and 2.

FIG. 3 is a diagram illustrating a flowchart showing a process performed by the image processing apparatus 10 illustrated in FIGS. 1 and 2. The process illustrated in FIG. 3 is started upon reception of a reading command issued to the scanner 20 (see FIG. 1).

Here, first, it is determined whether or not there are documents on the document tray 21 of the scanner 20 (step S11). In the case where there is no document on the document tray 21, the process simply ends.

In the case where there are documents on the document tray 21, one document stacked on the top of the documents is fed into the scanner 20, an image recorded on the document is photoelectrically read, and image data is generated (step S12). The generated image data is transmitted to the notebook PC 30.

In the notebook PC 30, an image processing program that causes the notebook PC 30 to execute the following process is executed, and the image data transmitted from the scanner 20 is received by the notebook PC 30 (step S13).

Next, it is determined whether or not the received image data is the image data acquired by reading the first document (step S14). In the case where the captured image data is the image data acquired by reading the first document, the image data is temporarily stored as a blank document (step S15).

Note that, since it is clear that images in a data format are handled here, image data and images are not specifically distinguished from each other in terms of expression, and "image data" may also be referred to as "image" or "document".

In the case where it is determined in step S14 that the received image data is the image data acquired by reading a certain document, which is one of the second and subsequent documents, the certain document is recognized as a filled-in document, and a difference document is generated by extracting the difference between the filled-in document and the blank document temporarily stored in step S15 (step S16).

Here, the blank document and the filled-in document according to the present exemplary embodiment correspond to an example of a first image (or first image data) and an example of a second image (or second image data), respectively, according to the exemplary embodiment of the present invention.

Figure 4A:
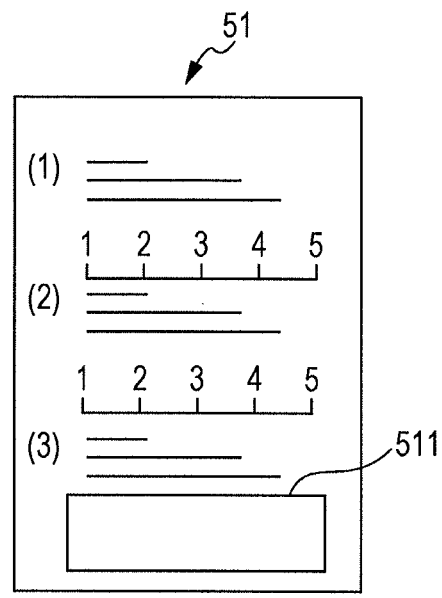
FIGS. 4A and 4B are diagrams illustrating an example of a blank document and an example of a filled-in document.
Figure 4B:
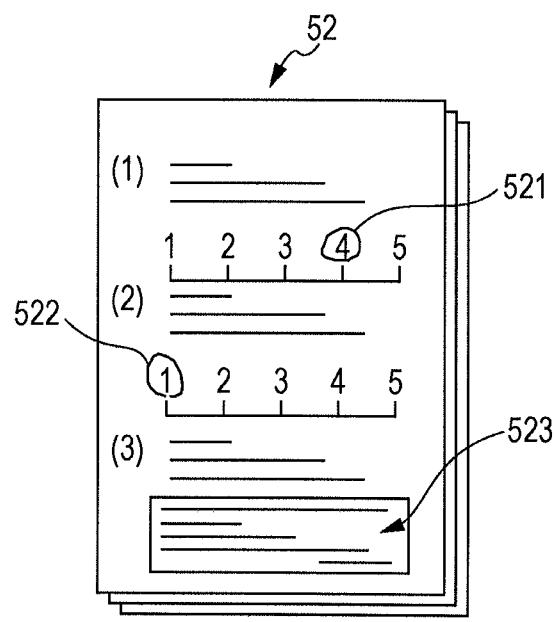

FIGS. 4A and 4B are diagrams illustrating an example of a blank document and an example of a filled-in document. FIG. 4A shows a blank questionnaire, that is, a blank document 51. Here, there are three questions (1) to (3) as the content of the questionnaire, and answers to the questions (1) and (2) among these three questions are made in a form in which any one of numbers 1 to 5 is selected by being encircled with a circle. The question (3) is a question to which an answer is made in a form in which a questionnaire respondent freely fills in a blank answer column 511.

In addition, FIG. 4B shows a filled-in document 52, which is a questionnaire of the same format as the questionnaire illustrated in FIG. 4A, and in which a questionnaire respondent has written his or her answers. The number of filled-in documents is not limited to one. Among multiple documents sequentially read by the scanner 20, the second and subsequent documents are treated as filled-in documents on a paper-sheet-by-paper-sheet basis.

In one filled-in document illustrated in FIG. 4B, regarding the question (1), the number "4" is encircled with a circle 521. In addition, regarding the question (2), the number "1" is encircled with a circle 522. Furthermore, regarding the question (3), a character string 523 written in an answer column, which used to be blank, by a questionnaire respondent is arranged.

Figure 5:
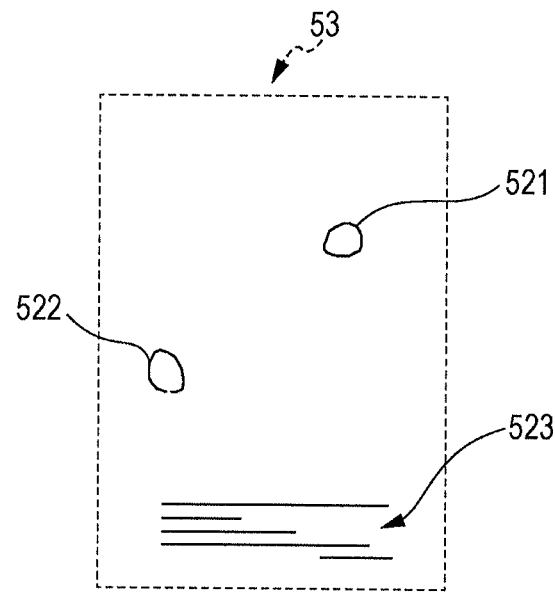
FIG. 5 is a diagram illustrating an example of a difference image.

FIG. 5 is a diagram illustrating an example of a difference image.

As described above, in step S16 of FIG. 3, a difference image 53 between the blank document temporarily stored in step S15 and one filled-in document acquired this time among the filled-in documents, which are the second and subsequent documents, is generated. In the case where the difference image 53 between the blank document 51 of FIG. 4A and the filled-in document 52 of FIG. 4B is generated, only the two circles 521 and 522 and the character string 523 written by the questionnaire respondent are extracted.

The description continues with reference to FIG. 3 again.

When the difference image 53 (see FIG. 5) is generated in step S16 of FIG. 3, the pattern written by the questionnaire respondent appears on the difference image 53. Next, character recognition regions are set in accordance with the pattern on the difference image 53 (step S17). A character recognition process is executed on partial images recorded in the character recognition regions (step S20).

Figure 6:
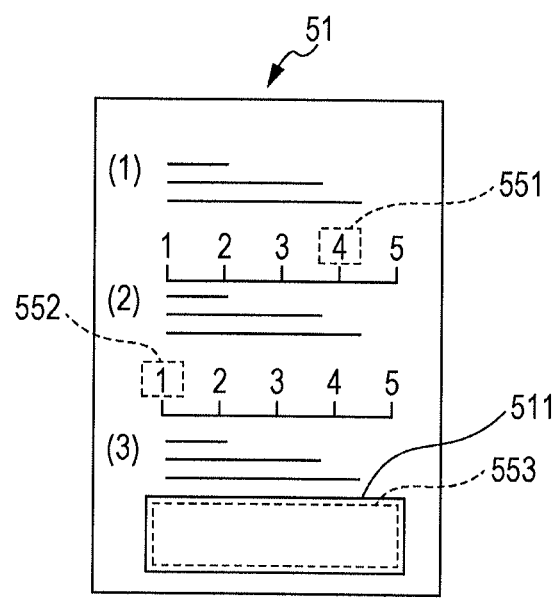
FIG. 6 is a diagram illustrating set character recognition regions overlying a blank document the same as that illustrated in FIG. 4A.

FIG. 6 is a diagram illustrating set character recognition regions overlying a blank document the same as that illustrated in FIG. 4A.

Here, three character recognition regions 551, 552, and 553 are set. In the character recognition process of step S20, character recognition is performed on each of the three character recognition regions 551, 552, and 553. Among the three character recognition regions 551, 552, and 553, two character recognition regions 551 and 552 correspond to the two circles 521 and 522 written by the questionnaire respondent (see FIG. 4A), and the other character recognition region 553 corresponds to the answer column 511, which used to be blank before being filled in by the questionnaire respondent (see FIG. 4A).

Here, a collection of processing for reading image data performed in step S13 and processing for classifying the image data into a blank document or a filled-in document in accordance with whether or not the image data is image data acquired by reading the first document (steps S14 to S16) corresponds to an example of an image acquisition unit according to the exemplary embodiment of the present invention.

In addition, a combination of the difference-image generation process performed in step S16 and the character-recognition-region extraction process performed in step S17 in accordance with the difference image corresponds to an example of a region specifying unit according to the exemplary embodiment of the present invention.

Furthermore, the character recognition process of step S20 corresponds to an example of a partial-image recognition unit according to the exemplary embodiment of the present invention.

Figure 7:
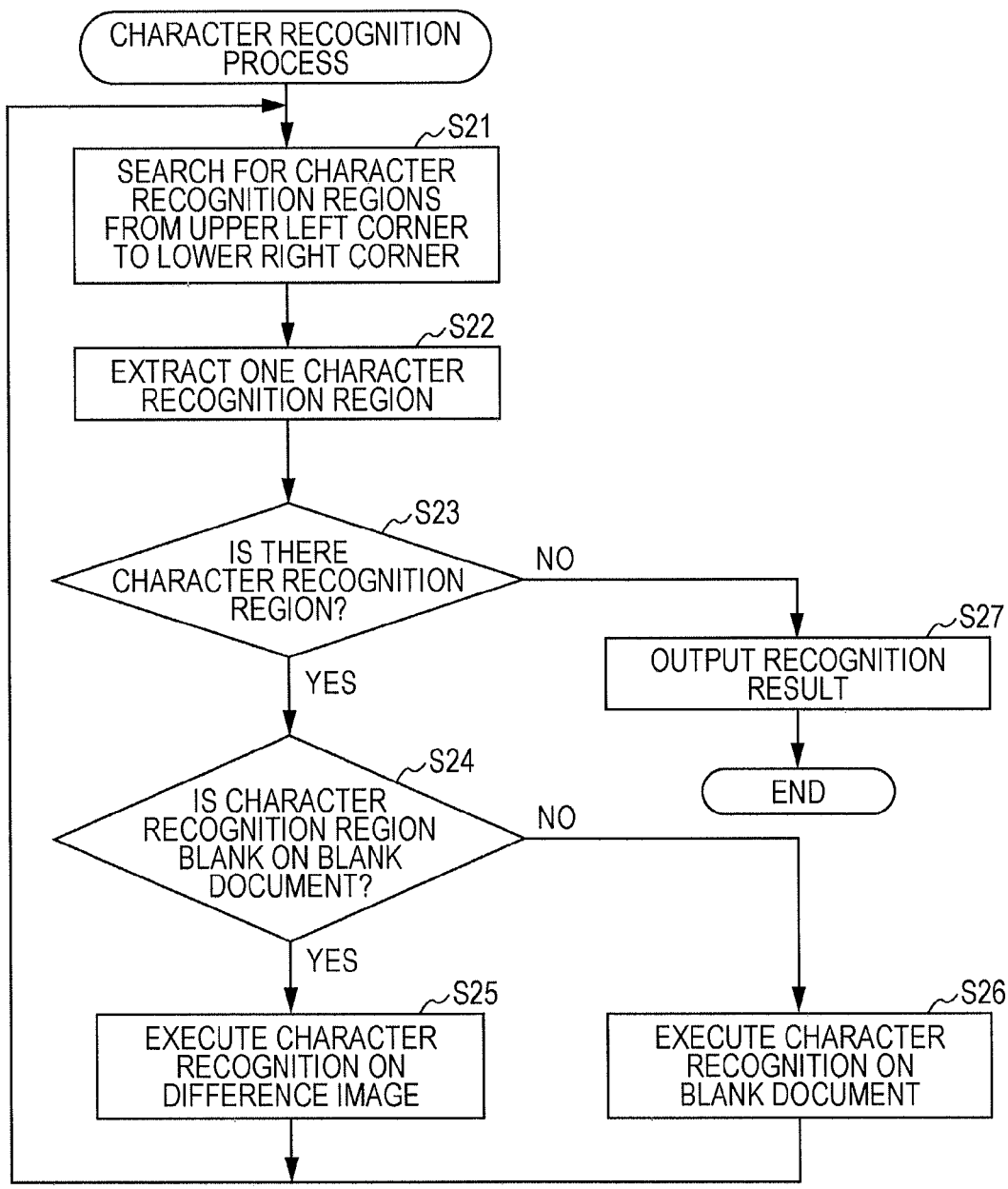
FIG. 7 is a diagram illustrating the flowchart of a character recognition process illustrated as one step in FIG. 3.

FIG. 7 is a diagram illustrating the flowchart of the character recognition process illustrated as one step in FIG. 3.

Here, first, the difference image 53 is searched for extracted character recognition regions from the upper left corner to the lower right corner (step S21). When a character recognition region is found, the found character recognition region is extracted (step S22).

An example in which three character recognition regions illustrated in FIG. 6 are extracted will be described.

In this case, first, the character recognition region 551, which is the uppermost character recognition region, is extracted. Here, since a character recognition region is extracted, it is determined in step S23 that there is a character recognition region, and the process proceeds to step S24. In step S24, it is determined whether or not the character recognition region 551 is a blank region on the blank document 51 (see FIGS. 4A and 6).

As is clear from FIG. 6, the number "4" is written in the character recognition region 551. Accordingly, although character recognition has not yet been performed at this stage, it is determined that the character recognition region 551 is not blank. In this case, the process proceeds to step S26, and character recognition is performed on the number "4" described there on the blank document 51 (FIGS. 4A and 6).

Thereafter, the process returns to step S21. The search for extracted character recognition regions is started again from the position next to the character recognition region 551 extracted this time, and the next character recognition region 552 is extracted (step S22). The character recognition region 552 is also not blank on the blank document 51. The process proceeds to step S26, and character recognition is performed on the number "1" on the blank document 51.

Likewise, in step S22, the next character recognition region 553 is extracted. The character recognition region 553 is a blank region on the blank document 51. Accordingly, it is determined in step S24 that the character recognition region 553 is blank, and the process proceeds to step S25. In step S25, character recognition is executed on a character string written in the character recognition region 553 on the difference image 53 (see FIG. 5).

Note that, in step S25, character recognition may also be executed in accordance not with the difference image 53 but with an image of the filled-in document 52 (see FIG. 4B).

Next, the process returns to step S21, and is started again. It is then determined in step S23 that there is no more character recognition region to be extracted, and the process proceeds to step S27. In step S27, a recognition-result output process is performed and the series of pieces of processing illustrated in FIG. 7 ends. In the recognition-result output process, a character-recognition result for the filled-in document, which is a one-paper-sheet document, treated as a character-recognition target this time is, for example, displayed on the display screen of the notebook PC 30 or written into a file for recording of character-recognition results.

Thereafter, as illustrated in FIG. 3, the process is performed on the next document. When all the documents are processed, the series of pieces of processing illustrated in FIG. 3 also ends.

In this manner, according to the present exemplary embodiment, answers of questionnaire respondents may be recognized without preset settings such that, for positions of marks of a mark sense card, information regarding what marks at respective positions represent is input in advance.

Here, in the case of the present exemplary embodiment, rules are set such that, among multiple documents sequentially read by the scanner 20, the first document is treated as a blank document and the second and subsequent documents are treated as filled-in documents. However, in the present exemplary embodiment of the present invention, the blank document does not always have to be arranged at a specific position such as at the first paper sheet of documents. The blank document may be, for example, sandwiched between certain filled-in documents in stacked multiple filled-in documents. In that case, a process for finding a blank document from among multiple documents is performed by the image acquisition unit. As an example of the process for finding a blank document, processing for sequentially extracting the differences between the first document and the second and subsequent documents is performed, and a certain document for which a difference occurs only for the first document is treated as a blank document. In addition, an image is generated by extracting portions common to multiple documents on the data acquired by reading the multiple documents regardless of whether each of the multiple documents is a blank document or a filled-in document, pattern matching is performed between the generated image and each of the read multiple documents, and the document having the highest degree of matching may be treated as a blank document.

Alternatively, even when reading of filled-in documents is completed by performing reading on multiple occasions, reading of a blank document is performed only once for the same type of document. A blank document read once is stored, and a blank document corresponding to filled-in documents read this time may be specified by performing pattern matching or characteristic-point extraction using the filled-in documents read this time, or by performing form recognition in which the degree of matching of a region encircled by straight lines is used.

Furthermore, in the exemplary embodiment of the present invention, reading of a blank document is not always required. A blank document may be generated on data, for example, by extracting portions common to multiple filled-in documents from the multiple filled-in documents. In this case, the blank document generated on data by extracting the common portions corresponds to the first image data representing the first image.

In addition, here, the image processing apparatus 10 made from a combination of the scanner 20 and the notebook PC 30 illustrated in FIG. 1 has been described; however, an image processing apparatus according to the exemplary embodiment of the present invention does not always have to have this form. For example, the functions of an image processing apparatus according to the exemplary embodiment of the present invention may also be incorporated into a copier into which a scanner and a printer are integrated or a multifunction machine having more functions. Furthermore, the functions of an image processing apparatus according to the exemplary embodiment of the present invention may also be incorporated into portable terminals equipped with a camera function. In that case, the image reading unit may capture images of documents using the camera function.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   a processor configured to act as:
      an image acquisition unit that acquires first image data representing a first image and second image data representing a second image that is an image acquired by performing additional recording on the first image;
      a region specifying unit that specifies a region, where additional recording is performed with respect to the first image, of the second image in accordance with the first image data and the second image data acquired by the image acquisition unit; and
      a partial-image recognition unit that recognizes a partial image recorded in the region specified by the region specifying unit,
   wherein the region specifying unit compares the first and second images to generate a difference image, and specifies the region where additional recording is performed on the difference image and specifies the corresponding region on the first image,
   wherein the partial-image recognition unit determines whether to perform character recognition on the corresponding region of the first image or the specified region of the difference image based on whether the corresponding region on the first image is blank,
   wherein when the partial-image recognition unit determines that the corresponding region on the first image is not blank, the partial-image recognition unit performs character recognition in the region on the first image instead of performing character recognition in the specified region of the difference image, and
   wherein when the partial-image recognition unit determines that the corresponding region on the first image is blank, the partial-image recognition unit performs character recognition in the specified region of the difference image instead of performing character recognition in the region of the first image.

2. The image processing apparatus according to claim 1, wherein the processor is further configured to act as:
   a difference extraction unit that extracts the difference between the first image and the second image,
   wherein the region specifying unit specifies the region, where additional recording is performed, using the difference extraction unit.

3. The image processing apparatus according to claim 2, wherein the image acquisition unit distinguishes the first image data from the second image data in accordance with the order in which pieces of image data are acquired.

4. The image processing apparatus according to claim 3, wherein in a case where the region specified by the region specifying unit is a blank region on the first image, the partial-image recognition unit treats as a recognition target a partial image located on the second image and corresponding to the region or a partial image located on a difference image between the first image and the second image and corresponding to the region, and in a case where the region is not a blank region on the first image, the partial-image recognition unit treats as a recognition target a partial image located on the first image and corresponding to the region.

5. The image processing apparatus according to claim 2, wherein the partial-image recognition unit recognizes a character represented by the partial image recorded in the region specified by the region specifying unit.

6. The image processing apparatus according to claim 2, wherein the partial-image recognition unit treats as a recognition target a partial image located on the first image and corresponding to the region specified by the region specifying unit.

7. The image processing apparatus according to claim 2, wherein in a case where the region specified by the region specifying unit is a blank region on the first image, the partial-image recognition unit treats as a recognition target a partial image located on the second image and corresponding to the region or a partial image located on a difference image between the first image and the second image and corresponding to the region, and in a case where the region is not a blank region on the first image, the partial-image recognition unit treats as a recognition target a partial image located on the first image and corresponding to the region.

8. The image processing apparatus according to claim 1, wherein the image acquisition unit distinguishes the first image data from the second image data in accordance with the order in which pieces of image data are acquired.

9. The image processing apparatus according to claim 8, wherein the partial-image recognition unit recognizes a character represented by the partial image recorded in the region specified by the region specifying unit.

10. The image processing apparatus according to claim 8, wherein the partial-image recognition unit treats as a recognition target a partial image located on the first image and corresponding to the region specified by the region specifying unit.

11. The image processing apparatus according to claim 1, wherein the partial-image recognition unit recognizes a character represented by the partial image recorded in the region specified by the region specifying unit.

12. The image processing apparatus according to claim 1, wherein the partial-image recognition unit treats as a recognition target a partial image located on the first image and corresponding to the region specified by the region specifying unit.

13. The image processing apparatus according to claim 1, wherein the partial-image recognition unit treats as a recognition target a partial image located on the first image and corresponding to the region specified by the region specifying unit, or a partial image located on the second image and corresponding to the region specified by the region specifying unit.

14. An image processing method comprising:
  acquiring first image data representing a first image and second image data representing a second image that is an image acquired by performing additional recording on the first image;
  specifying a region, where additional recording is performed with respect to the first image, of the second image in accordance with the acquired first image data and the acquired second image data;
  recognizing a partial image recorded in the specified region;
  comparing the first and second images to generate a difference image, specifying the region where additional recording is performed on the difference image and specifying the corresponding region on the first image;
  determining whether to perform character recognition on the corresponding region of the first image or the specified region of the difference image based on whether the corresponding region on the first image is blank;
  when the corresponding region on the first image is not blank, performing character recognition in the region on the first image instead of performing character recognition in the specified region of the difference image; and
  when the corresponding region on the first image is blank, performing character recognition in the specified region of the difference image instead of performing character recognition in the region of the first image.

15. A non-transitory computer readable medium storing a program causing a computer to execute a process, the process comprising:
  acquiring first image data representing a first image and second image data representing a second image that is an image acquired by performing additional recording on the first image;
  specifying a region, where additional recording is performed with respect to the first image, of the second image in accordance with the acquired first image data and the acquired second image data;
  recognizing a partial image recorded in the specified region;
  comparing the first and second images to generate a difference image, specifying the region where additional recording is performed on the difference image and specifying the corresponding region on the first image;
  determining whether to perform character recognition on the corresponding region of the first image or the specified region of the difference image based on whether the corresponding region on the first image is blank;
  when the corresponding region on the first image is not blank, performing character recognition in the region on the first image instead of performing character recognition in the specified region of the difference image; and
  when the corresponding region on the first image is blank, performing character recognition in the specified region of the difference image instead of performing character recognition in the region of the first image.

* * * * *